United States Patent [19]

Nolle et al.

[11] Patent Number: 4,904,527

[45] Date of Patent: Feb. 27, 1990

[54] LAMINATION FOR USE IN TRANSFORMERS OR THE LIKE AND METHOD OF MAKING THE SAME

[75] Inventors: Eugen Nolle, Sachsenheim; Hugo W. Geschka, Chamerau, both of Fed. Rep. of Germany

[73] Assignee: E. Blum GmbH & Co., Vaihingen, Fed. Rep. of Germany

[21] Appl. No.: 557,661

[22] Filed: Dec. 2, 1983

[30] Foreign Application Priority Data

Dec. 3, 1982 [DE] Fed. Rep. of Germany ....... 3244823

[51] Int. Cl.$^4$ .......................... H01F 1/16; H01F 3/02; H01F 27/24; H02K 1/02

[52] U.S. Cl. .................................... 428/334; 427/208; 428/432; 428/240

[58] Field of Search ................ 427/208; 428/240–242, 428/334, 323, 325, 331, 432, 433, 327

[56] References Cited

U.S. PATENT DOCUMENTS

| | | | |
|---|---|---|---|
| 2,488,391 | 11/1949 | Ford et al. | 336/210 X |
| 2,728,700 | 12/1955 | Gatke | 428/242 X |
| 3,222,626 | 12/1965 | Feinberg et al. | 336/210 |
| 3,594,049 | 7/1971 | Turner | 428/240 X |
| 4,001,616 | 1/1977 | Lonseth et al. | 428/323 X |
| 4,042,559 | 8/1977 | Abelson et al. | 428/242 X |
| 4,048,370 | 9/1977 | Orkin et al. | 428/323 |
| 4,085,239 | 4/1978 | Briston et al. | 427/208 |
| 4,241,129 | 12/1980 | Marton et al. | 428/344 X |
| 4,286,010 | 8/1981 | Staley et al. | 428/241 X |
| 4,407,872 | 10/1983 | Horii | 428/344 X |

OTHER PUBLICATIONS

Kirk-Othomer-Encyclopedia of Chemical Tech. 3rd Ed., vol. 13, "Hydrogen-Ion Activity to Laminated Material, Glass," p. 535.

Kirk-Othomer-Encyclopedia of Chemical Tech. 3rd Ed., vol. 1, "A To Alkanolamines," pp. 490–491.

*Primary Examiner*—Nancy A. B. Swisher

*Attorney, Agent, or Firm*—Peter K. Kontler

[57] ABSTRACT

An inexpensive lamination for use in transformers and/or other static or dynamic electric machines has a metallic layer one side of which is provided with a coat of hardenable adhesive and the other side of which is provided with a coat of insulating material. At least the adhesive coat can contain particles of sand, glass, a metallic oxide or a synthetic plastic material; such particles act as distancing elements between the respective side of the metallic layer and an adjacent metallic layer. The two coats are applied simultaneously between an unwinding station for a web or strip of coherent metallic layers and a winding station for the freshly coated web or strip of coherent metallic layers.

20 Claims, 1 Drawing Sheet

LAMINATION FOR USE IN TRANSFORMERS OR THE LIKE AND METHOD OF MAKING THE SAME

BACKGROUND OF THE INVENTION

The present invention relates to improvements in laminations for use in transformers, constant voltage regulators, chokes, electric motors and/or other static or dynamic electric machines. The invention also relates to a method of making such laminations.

It is already known to hold together a stack of laminations which are to form an iron core or the like by resorting to a suitable adhesive. In accordance with a presently known proposal, the laminations constitute stampings which are obtained from sheets of metallic material and both sides of each stamping are coated with an adhesive substance. The stampings are stacked to form cores of desired height, and the bonding operation is carried out by the application of mechanical pressure and heat. In such cores, the adhesive coats must also perform the function of insulators which can create problems when the stampings exhibit projections which are likely to penetrate through the adjacent adhesive coats and to establish electrical connections between neighboring stampings. The projections can develop as a result of buckling or bending of the metallic sheet material, in the course of stamping and/or as a result of cutting. Direct contact between neighboring stampings entails eddy current losses in the core with adverse influence upon the no-load current as well as magnetic hysteresis losses.

In accordance with another prior proposal in connection with the making of laminated cores for electric machines which must satisfy higher standards regarding their electrical and/or electromagnetic properties, both sides of each metallic layer or lamination are coated with a special insulating material. The insulating material is applied to both sides of a sheet metal blank which is thereupon converted into a plurality of laminations in a stamping machine. The thus obtained laminations are stacked to form a core and are bonded to each other by resorting to a casting resin which fills the gaps between neighboring laminations. A drawback of cores which are assembled of such laminations is that their mechanical stability does not suffice under certain circumstances, e.g., when the machine embodying one or more laminated cores is subjected to dynamic stresses such as vibrations. In order to enhance the mechanical stability of such cores, it is known to surround them by bandages and/or to resort to rivets, screws and/or other types of fasteners. This complicates the making of cores and contributes significantly to their manufacturing cost.

In accordance with still another prior proposal, both sides of each lamination are coated first with an insulating material and each of the thus obtained insulating coats is thereupon coated with an adhesive substance. Such proposal also exhibits the drawback that the laminations and the laminated cores are quite expensive and that the making of such laminations consumes much time.

OBJECTS AND SUMMARY OF THE INVENTION

An object of the invention is to provide a novel and improved lamination which is relatively inexpensive and can be assembled with similar or identical laminations into a core exhibiting superior mechanical and other properties.

Another object of the invention is to provide a lamination which need not be provided with several coats of adhesive and/or insulating material.

A further object of the invention is to provide a lamination which can be reliably bonded to adjoining laminations without establishing a direct electrical connection between the metallic layers of neighboring laminations.

An additional object of the invention is to provide a lamination which can be mass produced at a reasonable cost and which is constructed in such a way that it enhances the electric properties of the machines in which it is put to use.

A further object of the invention is to provide a novel and improved method of making laminations of the above outlined character.

An additional object of the invention is to provide a novel method of assembling laminations of the above outlined character into cores or like structures for use in static or dynamic electric machines.

One feature of the invention resides in the provision of a lamination for use in the cores of transformers, chokes, constant voltage regulators, electric motors and/or other static or dynamic electric machines. The improved lamination comprises a metallic layer having a first side and a second side, an insulating coat overlying the first side of the metallic layer, and an adhesive coat overlying the second side of the metallic layer. The adhesive coat preferably consists of a hardenable material, e.g., a polymerizable synthetic plastic substance.

The lamination preferably further comprises deformation-resistant particles of insulating material. Such particles are distributed or dispersed in at least one of the coats, preferably in the adhesive coat. The dimensions of the particles are preferably selected in such a way that they at most equal or approximate the thickness of the one coat, or the thickness of the one coat can exceed the maximum dimensions of the particles. For example, the dimensions of the particles can be in the range of between five and ten thousandths of one millimeter. Such particles may consist of or include grains of sand, pieces of glass, fragments of a metallic oxide or particles consisting of a suitable synthetic plastic material.

Another feature of the invention resides in the provision of a method of making a lamination for use in transformers, chokes, constant voltage regulators, electric motors and/or other static or dynamic electric machines. The method comprises the steps of applying to one side of a metallic layer an adhesive coat and simultaneously applying an insulating coat to the other side of the metallic layer. Such simultaneous application of the two coats can take place before the metallic layer is stamped out of a blank consisting of metallic sheet stock, and the two applying steps are preferably carried out between an unwinding station where a length of metallic sheet stock (coherent metallic layers) is paid out from a roll and a winding station where the freshly coated sheet stock is converted back into a roll, either without any severing or subsequent to subdivision into narrower strips or bands. Such strips or bands are then converted into discrete laminations in a stamping machine or the like.

The novel features which are considered as characteristic of the invention are set forth in particular in the appended claims. The improved lamination itself, however, both as to its construction and the method of making the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
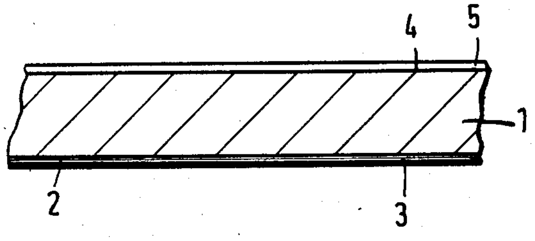
FIG. 1 is an enlarged fragmentary sectional view of a lamination which embodies one form of the invention.

The lamination which is shown in FIG. 1 comprises a centrally located metallic layer 1 the upper side 4 of which is provided with a coat 5 of hardenable adhesive, e.g., a so-called baked lacquer. The underside 2 of the metallic layer 1 is provided with a coat 3 of insulating material. The exact nature of the insulating material which forms the coat 3 forms no part of the invention.

Figure 2:
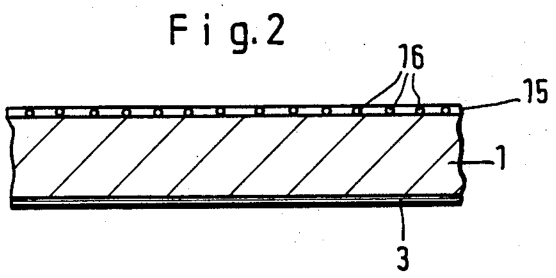
FIG. 2 is a similar enlarged fragmentary sectional view of a modified lamination wherein the adhesive coat contains particles of a deformation-resistant insulating material.

FIG. 2 shows a modified lamination having a centrally located metallic layer 1, a coat 3 of insulating material at one side of the metallic layer 1, and a coat 15 of adhesive material which is applied to the other side of the metallic layer. In addition, the lamination of FIG. 2 comprises particles 16 which consist of a deformation-resistant insulating material and are dispersed or otherwise suitably distributed in the material of the adhesive coat 15. The particles 16 perform the function of distancing elements, i.e., they prevent direct contact between the upper side of the layer 1 which is shown in FIG. 1 and the underside of a metallic layer which is placed thereabove so that it overlies the adhesive coat 15. The layer 1 can constitute a portion of a metallic sheet, strip, band or plate. The particles 16 ensure that, when two or more superimposed laminations of the type shown in FIG. 2 are pressed against each other or baked, e.g., in order to cause the material of the coat 15 to set, the thickness of the adhesive coat 15 is not reduced below a preselected minimum value, namely, such minimum thickness corresponds to the maximum dimensions of the particles 16. For example, the dimensions of the particles 16 can be in the range of between five and ten thousandths of one millimeter. These dimensions can match the original thickness of the adhesive coat 15, or the original thickness of such adhesive coat can at least slightly exceed the maximum dimensions of the particles. The particles 16 also protect the insulating coat 3, i.e., they ensure that the thickness of this coat is not reduced to zero and they thus prevent direct contact between the metallic layers 1 of two neighboring laminations. In most instances, the dimensions of the particles 16 will or can be selected in such a way that their dimensions match or approximate the thickness of the adhesive coat 15. Somewhat smaller insulating and pressure-resistant particles can be used with equal or similar advantage.

Figure 3:
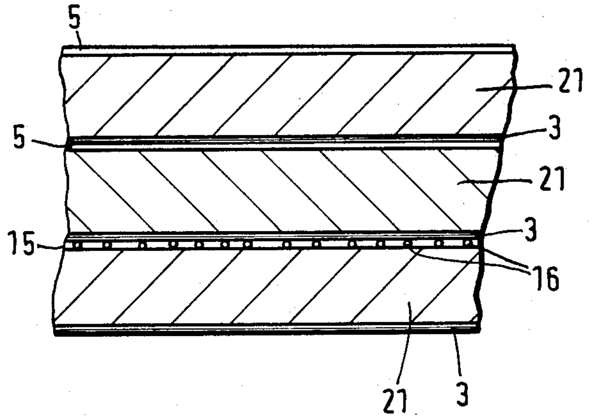
FIG. 3 is a fragmentary sectional view of a stack of laminations of the type shown in FIGS. 1 and 2.

FIG. 3 shows that, in an assembled core, the insulating coat 3 of one of two neighboring laminations abuts against the adhesive coat 5 or 15 of the other neighboring lamination. This ensures that, even if the material of the adhesive coat on a particular lamination is shifted as a result of the existence of unevennesses on the sides of metallic layers 21 and/or for other reasons, the neighboring layers 21 are still adequately insulated from each other. The insulating layers 3 preferably offer a pronounced resistance to deformation, i.e., to squeezing out of the spaces between two neighboring metallic layers 21. The reliability of the core, as concerns the establishment of insulating coats between neighboring metallic layers 21, is further enhanced by the provision of particles 16. While FIG. 3 merely shows insulating and distancing particles 16 between the two lower metallic layers 21, it is clear that such particles can be provided between each pair of neighboring metallic layers to further reduce the likelihood of improper insulation of neighboring metallic layers from each other.

An important advantage of the improved lamination is its simplicity, lower cost and reliability as concerns its insulating, mechanical and electrical properties. Moreover, the improved lamination can be assembled with identical or analogous laminations into cores whose properties are superior to those of heretofore known cores; this prolongs the useful life and improves the operation of electric machines which employ such cores. All that one must attend to is to ensure that the laminations are stacked in a manner as shown in FIG. 3, namely, that the insulating coat of one metallic layer abuts against the adhesive coat of the neighboring metallic layer. The coats 3 ensure proper insulation of the neighboring metallic layers from each other, and the adhesive coats ensure reliable bonding of neighboring laminations to each other, i.e., the adhesive coats enhance the mechanical stability of the assembled core so that the latter can readily stand pronounced dynamic stresses such as shocks, vibrations and/or others.

Another important advantage of the improved lamination is that it requires surprisingly small quantities of insulating and/or adhesive material. This is due to the fact that the insulating coat is applied only to one side of the metallic layer, and the same holds true for the material of the adhesive coat. The insulating coats between neighboring metallic layers remain intact (i.e., they prevent direct metal-to-metal contact between neighboring layers) even if the adhesive material is of the type which sets in response to the application of pronounced pressures.

Still another advantage of the improved lamination is that it can be assembled with similar laminations into cores whose so-called space factor is much more satisfactory than the space factors of conventional cores. This is due to the fact that each metallic layer 1 or 21 carries a single insulating coat and a single adhesive coat. The improved space factor enhances the electromagnetic properties of the core.

The drawing shows particles 16 of deformation-resistant insulating metallic (oxide), vitreous, plastic or like material in the adhesive coat 15. However, it is also within the purview of the invention to provide such particles only in the insulating coat 3 or in the insulating coat as well as in the adhesive coat of each and every lamination. As mentioned above, the particles 16 further enhance the quality of insulation between neighboring metallic layers of a core or the like. Moreover, and if the dimensions of the particles 16 are at least nearly uniform, they ensure that the thicknesses of insulating coats between neighboring metallic layers are the same from lamination to lamination.

The method of making the improved laminations preferably involves simultaneously coating the respective sides of a metallic layer 1 or 21 with an insulating material as well as with an adhesive substance. This saves time and space for the manufacture of blanks which are thereupon converted into individual laminations in a stamping or other suitable machine. It is preferred to effect the application of insulating and adhesive coats between an unwinding station and a winding station for one or more bands, strips or webs of metallic sheet material. The particles 16 can be admixed to or dispersed in the insulating and/or adhesive mass prior to spreading of the mass onto the respective side of the metallic layer. The application of adhesive and insulating coats can be effected by spraying, rolling, partial dipping of the metallic layer into suitable baths and/or by resort to other available procedures.

As a rule, or at least in many instances, the metallic layers are obtained by stamping from strips or webs of metallic sheet material. Such material is furnished from the supplier (e.g., steel works) in the form of rolls which are unwound at the aforementioned unwinding station and are then simultaneously coated with insulating and adhesive materials prior to being rewound at the aforementioned winding station. The rewinding can follow the subdivision of a relatively wide web or band into narrower strips which are thereupon converted into rolls and delivered to the stamping machine for the making of discrete laminations. The unwinding and winding can be carried out in a first plant, and the stamping can be carried out in a separate second plant. Of course, it is also possible to transport successive increments of a freshly coated web or band directly to the stamping station or to another station where the freshly coated band or web is caused to yield discrete laminations.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A lamination for use in the cores of transformers, chokes, constant voltage regulators, electric motors and like static or dynamic electric machines, comprising a metallic layer having a first side and a second side; an insulating coat overlying the first side of said layer; and an adhesive coat of hardenable material overlying the second side of said layer.

2. The lamination of claim 1, further comprising particles of deformation-resistant insulating material distributed in at least one of said coats.

3. The lamination of claim 2, wherein said one coat is said adhesive coat.

4. The lamination of claim 2, wherein said one coat has a predetermined thickness and the dimensions of said particles equal or approximate the thickness of said one coat.

5. The lamination of claim 2, wherein said one coat has a predetermined thickness which exceeds the dimensions of said particles.

6. The lamination of claim 2, wherein the maximum dimensions of said particles are in the range of between five and ten thousandths of one millimeter.

7. The lamination of claim 2, wherein said particles include grains of sand.

8. The lamination of claim 2, wherein said particles include particles consisting of glass.

9. The lamination of claim 2, wherein said particles include particles consisting of a metallic oxide.

10. The lamination of claim 2, wherein said particles include particles consisting of a synthetic plastic material.

11. A method of making a lamination for use in the cores of transformers, chokes, constant voltage regulators, electric motors and like static or dynamic electric machines, comprising the steps of applying to one side of a metallic layer an adhesive coat and simultaneously applying an insulating coat to the other side of the metallic layer.

12. The method of claim 11, wherein said applying steps are carried out between an unwinding station for several coherent metallic layers and a winding station for freshly coated coherent metallic layers.

13. The method of claim 11, further comprising the step of admixing particles of deformation-resistant insulating material to the material of at least one of said coats prior to application of the respective coat to the metallic layer.

14. The method of claim 13, wherein the one coat is the adhesive coat.

15. The method of claim 13, wherein the maximum dimensions of the particles are in the range of between five and ten thousandths of one millimeter.

16. The method of claim 13, wherein the thickness of the one coat equals or exceeds the maximum dimensions of the particles.

17. The method of claim 13, wherein the particles include granulae of sand.

18. The method of claim 13, wherein the particles include pieces of glass.

19. The method of claim 13, wherein the particles include particles consisting of a metallic oxide.

20. The method of claim 13, wherein the particles include particles consisting of a synthetic plastic material.

* * * * *